United States Patent [19]
Krause

[11] Patent Number: 6,027,076
[45] Date of Patent: Feb. 22, 2000

[54] METHOD FOR POWERING A SPACECRAFT WITH EXTENDED-LIFE BATTERY OPERATION

[75] Inventor: Stanley J. Krause, Northridge, Calif.

[73] Assignee: Hughes Electronics Corporation, Los Angeles, Calif.

[21] Appl. No.: 09/112,484

[22] Filed: Jul. 9, 1998

[51] Int. Cl.$^7$ ............................... B64G 1/10; B64G 1/42
[52] U.S. Cl. ....................................................... 244/158 R
[58] Field of Search ............................ 244/53 R, 158 R, 244/173

[56] References Cited

U.S. PATENT DOCUMENTS

| | | | |
|---|---|---|---|
| 4,507,371 | 3/1985 | Thackeray | 429/191 |
| 4,832,113 | 5/1989 | Mims et al. | 244/158 R X |
| 5,152,482 | 10/1992 | Perkins et al. | 244/158 R |
| 5,310,141 | 5/1994 | Homer et al. | 244/158 R |
| 5,634,612 | 6/1997 | Faisant | 244/173 X |

Primary Examiner—Robert P. Swiatek
Attorney, Agent, or Firm—Terje Gudmestad; Georgann Grunebach; Michael W. Sales

[57] ABSTRACT

A spacecraft, such as a satellite in geosynchronous orbit, is powered using at least two independently controllable batteries, such as lithium ion batteries, operably connected to the power-consuming components of the spacecraft. Each battery is operable in a higher-temperature range and inactivated in a lower-temperature range. The first battery and the second battery are operated in the higher-temperature range during a first period of time. The first battery is thereafter operated in the higher-temperature range during a second period of time, with the second battery being non-operational and in the lower-temperature range during the second period of time. The first battery and the second battery are thereafter operated in the higher-temperature range during a third period of time. The second battery is thereafter operated in the higher-temperature range during a fourth period of time, with the first battery being non-operational and in the lower-temperature range during the fourth period of time. The operable battery or batteries may be operated through a partial charging/discharging cycle. This alternating operation prolongs the lifetimes of the batteries.

19 Claims, 3 Drawing Sheets

METHOD FOR POWERING A SPACECRAFT WITH EXTENDED-LIFE BATTERY OPERATION

BACKGROUND OF THE INVENTION

This invention relates to spacecraft power systems, and, more particularly, to a method of powering a spacecraft with extended-life operation of the spacecraft batteries.

Spacecraft such as geosynchronous communications satellites require large amounts of power for the amplifiers and other electronics that relay signals from point to point on the earth's surface. The power is normally generated by solar cells mounted externally on the satellite and facing toward the sun. The solar cells produce power only when sunlight is incident upon the solar cells, and do not generate power when the satellite is in the earth's shadow.

The satellite's communications relay capabilities must continue to function when it is in shadow. A battery is provided onboard the spacecraft to receive and store excess power generated by the solar cells when the spacecraft is in sunlight, and to deliver that power to the power-consuming components when the spacecraft is in shadow. The battery therefore performs a charging/discharging cycle during periods when the satellite passes between sunlight and shadow. The battery also provides additional power for the operation of stationkeeping engines and backup power in other events.

Communications satellites are placed into geosynchronous orbit for expected periods of about 15 years or more. Because they are not readily accessible for repairs, the spacecraft systems, including the battery, must be operable and reliable for such extended periods of time without repair. Designed-in functional redundancy aids in achieving these goals, but it is highly desirable that the spacecraft systems, including the battery, have an expected operational life of at least 15 years or more.

The spacecraft batteries in use on today's orbiting communications satellites have well-established reliability records. However, there is a strong interest in using improved batteries incorporating advanced technologies to achieve higher energy storage capabilities per unit weight of the batteries, in order to reduce the relative weight of the batteries and provide greater communications relay capability. These improved batteries do not have the established reliability records of the existing batteries, simply because they are newer technologies. For this reason, there may be reluctance to use such improved batteries, even though they offer significant potential benefits in the spacecraft systems.

There is a need for an approach for battery utilization to achieve long-term operating lives, so that the batteries may be used in spacecraft applications. The present invention fulfills this need, and further provides related advantages.

SUMMARY OF THE INVENTION

The present invention provides an approach for powering a spacecraft providing extended battery life. This technique may be used in different ways, such as to provide safety margins in battery life, or to allow the use of batteries which would not otherwise qualify for extended-term applications. The approach of the invention does not require any change in the construction or operation of the batteries, but instead manages their operation so as to prolong their useful lives.

In accordance with the invention, a method for powering a spacecraft includes providing a spacecraft having at least two independently controllable electrical storage batteries, including a first battery and a second battery, operably connected to power-consuming components of the spacecraft Each battery is controllably activatable and controllably deactivatable. The duty cycle of the spacecraft power system includes operating both the first battery and the second battery during a first period of time with both batteries in an activated state. The first battery is thereafter operated during a second period of time in the activated state, with the second battery being in a deactivated state during the second period of time. Both the first battery and the second battery are operated during a third period of time, with both batteries in the activated state. The second battery is thereafter operated during a fourth period of time in the activated state, with the first battery being in the deactivated state during the fourth period of time.

In a preferred embodiment, the batteries are lithium ion batteries, which may be deactivated by discharging them and cooling them to a temperature whereat the electrochemical processes of the battery become largely inert. In this state, the battery and its internal components do not substantially degrade over time by corrosion or other mechanisms. The lithium ion battery may be reactivated from this deactivated state when its capability is again needed. That is, the battery may be effectively placed into a sleep state where it remains unchanged with time, and thereafter wakened to become operational.

In accordance with this aspect of the invention, a method for powering a spacecraft comprises the steps of providing a spacecraft having power-consuming components therein, and providing in the spacecraft at least two independently controllable electrical storage batteries, including a first battery and a second battery, operably connected to the power-consuming components of the spacecraft. Each battery is activated and operable in a higher-temperature range and inactivated and inoperable in a lower-temperature range. Power is provided by operating both the first battery and the second battery in the higher-temperature range during a first period of time. The first battery is thereafter operated in the higher-temperature range during a second period of time, with the second battery being non-operational and in the lower-temperature range during the second period of time. Both the first battery and the second battery are operated in the higher-temperature range during a third period of time. The second battery is thereafter operated in the higher-temperature range during a fourth period of time, with the first battery being non-operational and in the lower-temperature range during the fourth period of time.

The present invention is based upon a recognition of the annual variation in power storage requirements for satellites positioned in geosynchronous orbit and the activatable/deactivatable nature of some advanced batteries. The annual variation in power storage requirements stems from the fact that the relative amounts of time that the satellite is in sunlight and in shadow vary throughout the year. For most of the year, termed the "solstice period" in the art, the satellite is in constant direct sunlight and therefore relies relatively lightly on battery power for backup and some engine stationkeeping operations. However, for two periods of about 1½ months each, centered around the March 21 and September 21 equinox dates, and termed the "eclipse period" in the art, the satellite spends part of each 24-hour period in darkness and therefore relies more heavily on battery power. The available storage capacity of the battery system may accordingly be reduced during the solstice period but must be enlarged during the eclipse period. Thus, the 12 month year may be viewed as a 1½ month eclipse first period, a 4½ month solstice second period, a 1½ month eclipse third period, and a 4½ month solstice fourth period.

The cycle repeats in subsequent 12 month periods. During the first and third periods, more total battery capacity is required, and during the second and fourth periods, less total battery capacity is required. The lives of the batteries are extended by shutting down batteries during the second and fourth periods.

With the present invention, the battery system is provided with multiple, independently controllable batteries. The full capability of the multiple batteries (allowing for redundancy and other operational considerations) is used to provide storage capacity during the first eclipse period. As the satellite enters each solstice period, one or more of the batteries is inactivated to a sleep state, by discharging and cooling it in the case of the lithium ion battery. In this inactive state, the battery electrochemical storage capability is inoperable, and there is a suspension of the normal degradation processes of the elements of the battery. The inactivated battery is reactivated as the satellite begins the next eclipse period, by charging it and warming it to its operating temperature range. As the satellite enters the next solstice period, a different battery or set of batteries is placed into the inactive state. By rotating the inactive periods on an annual basis among the various batteries, the effective operating lifetime of each battery—before it would be expected to fail due to normal degradation mechanisms that are suspended during the inactive period—is lengthened. The required operating lifetime of each battery in a two-battery system is only 9.4 years to achieve 15 years of total battery system service. This shorter operating lifetime is more readily established for batteries incorporating advanced electrochemical storage technologies.

In another aspect of the invention, each battery, when in operation, may be charged and discharged to less than its maximum capability during each charge/discharge cycle, further prolonging its life.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
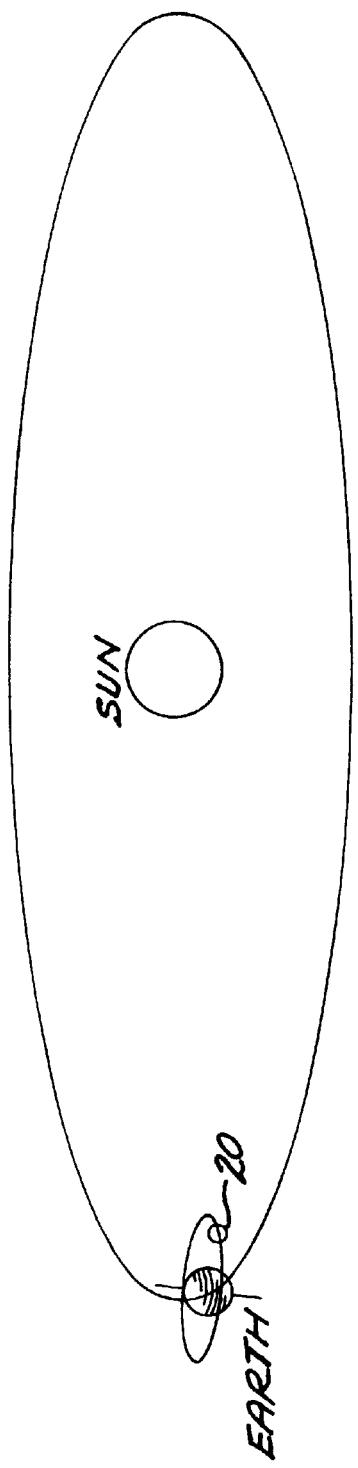
FIG. 1 is a schematic view of a satellite in geosynchronous earth orbit.

FIG. 1 illustrates a satellite 20 spacecraft in geosynchronous orbit above the equator of the earth. The satellite moves in a 24-hour orbit about the center of the earth (while keeping station above a selected location on the earth), and the earth moves in a 12-month orbit about the sun. During the two 1½ month eclipse periods, the satellite requires relatively high electrical energy storage capacity. During the two 4½ month solstice periods which alternate with the two eclipse periods, the satellite requires relatively low electrical energy storage capacity.

Figure 2:
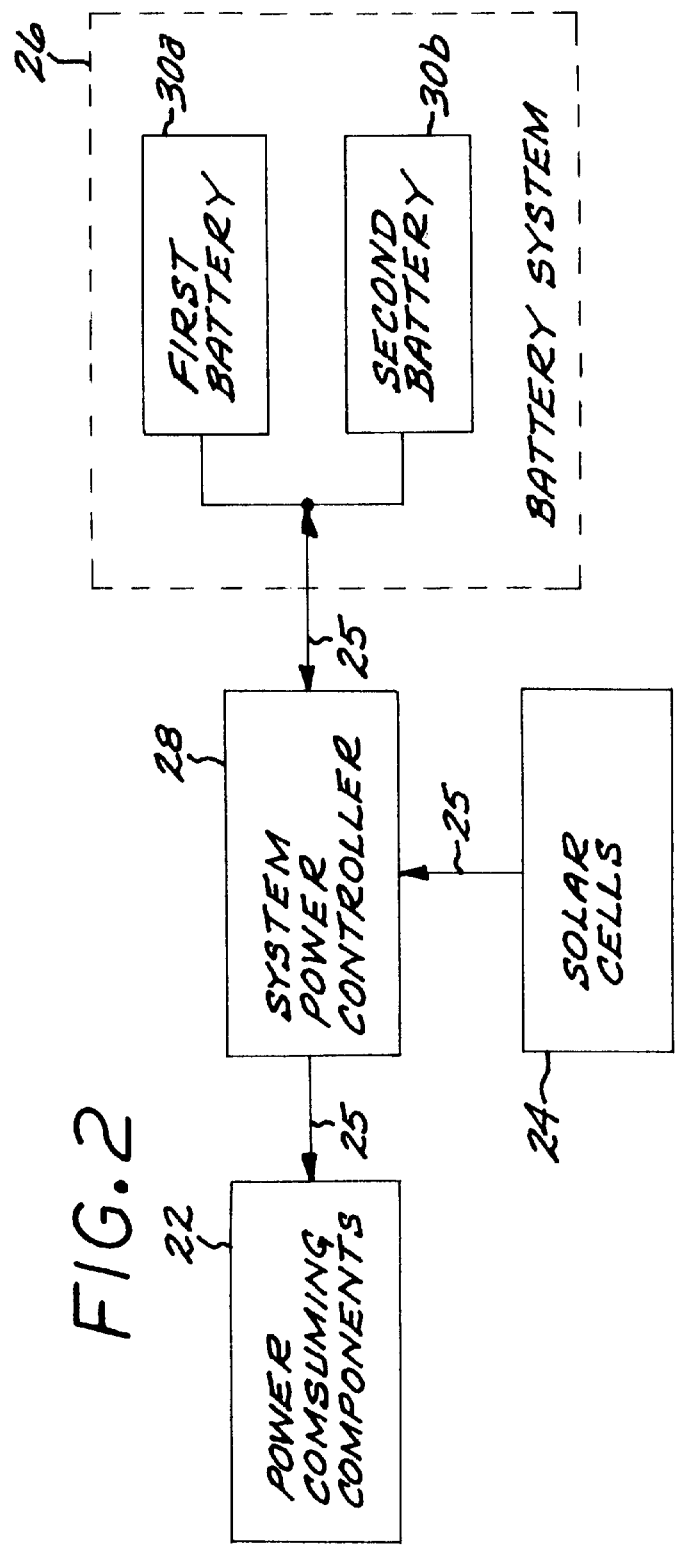
FIG. 2 is a schematic diagram of a spacecraft power system according to the invention.

FIG. 2 depicts the satellite power system in general form. Power is required by power-consuming components 22. Power is generated by solar cells 24 and delivered to a power system bus 25. Some of the power generated by the solar cells 24 is utilized immediately in the power-consuming components, and some of the power generated by the solar cells 24 is stored in a battery system 26. At a later time, when the solar cells 24 are not generating power because the satellite is in shadow, power stored in the battery system 26 is supplied to the power-consuming components 22. The distribution of power is controlled by a power system controller 28.

Figure 3:
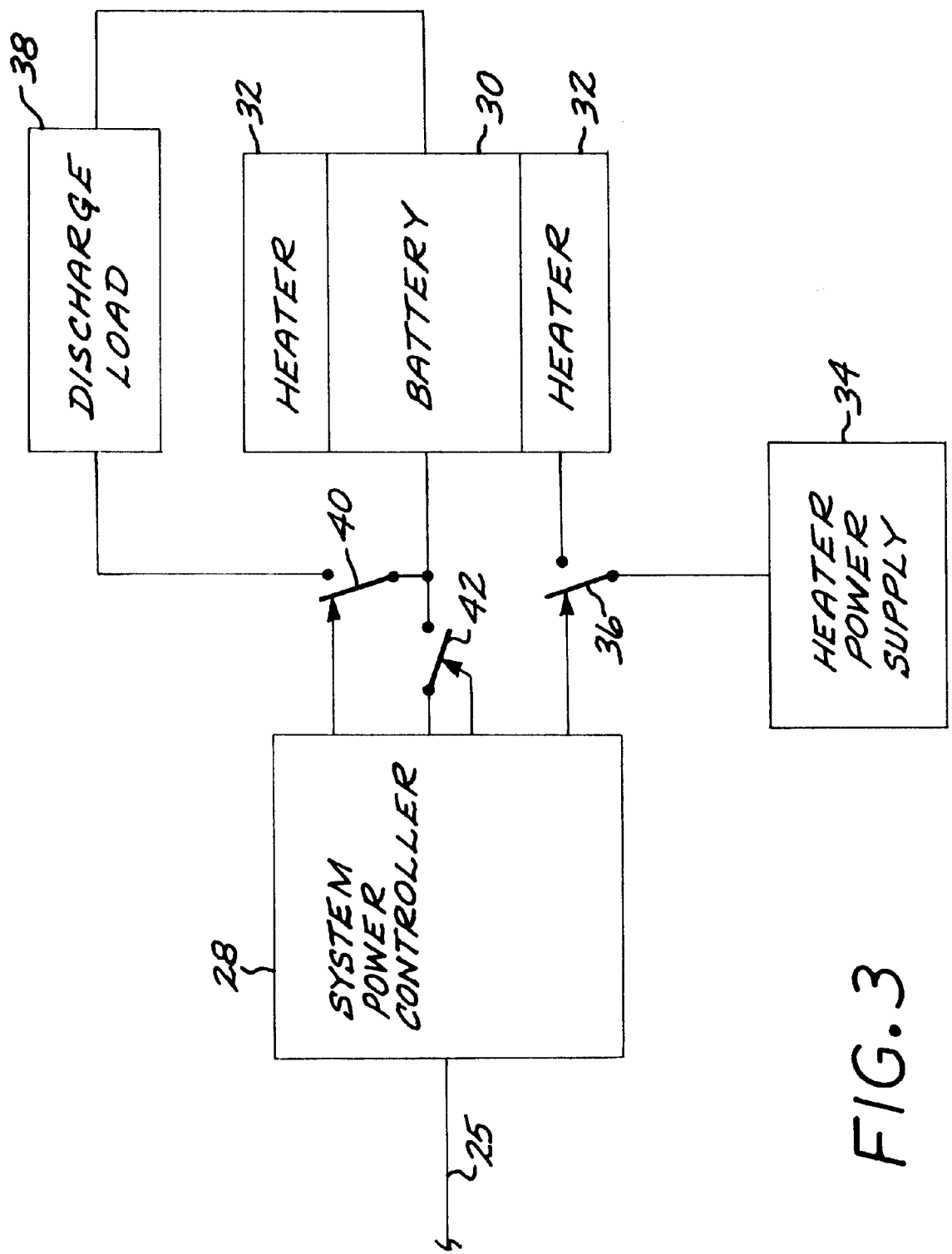
FIG. 3 is a schematic diagram of the spacecraft battery system used in the power system of FIG. 2.

The battery system 26 includes at least two independently controllable batteries 30, here depicted as a first battery 30a and a second battery 30b. One of the batteries 30 is illustrated in greater detail in FIG. 3. The battery 30 may be of any operable type that may be controllably transformed between an activated state and a deactivated state, but is preferably a lithium ion battery. Lithium ion batteries are known in the art, and their construction is described, for example, in U.S. Pat. No. 4,507,371. The battery is operated in a charging/discharging cycle.

In the case of the lithium ion battery, the battery may be controllably activated by heating it into a higher-temperature range, such as a temperature of from about 5° C. to about 15° C. The lithium ion battery may be controllably deactivated by discharging it and cooling it to a lower-temperature range, such as a temperature of from about −30° C. to about −10° C.

"Deactivation" means not just that the battery is not delivering or storing energy, but that its electrochemical reactions and functions are substantially suspended. When the battery is electrochemically functional and therefore activated, natural degradation mechanisms occur over time, which lead to failure of the battery after some period of time. When the battery is electrochemically nonfunctional and therefore deactivated, these degradation mechanisms do not proceed and the natural degradation mechanisms are not operable. In the case of the lithium ion battery, the transformation between the activated state and the deactivated state is achieved by controlling the temperature and charge of the battery. In another example, the transformation could be controlled by removing the electrolyte of the battery to deactivate the battery and thereafter providing electrolyte in the battery to activate the battery. An example of a battery that may be transformed from the deactivated to the activated state is the familiar automotive lead-acid battery, that is deactivated when supplied without water, and then activated by adding water to form the electrolyte. The moving of electrolyte is not a preferred approach, as it requires pumps and may be messy to accomplish. The activation and deactivation using heating and cooling and charge control, as in the case of the lithium ion battery, is preferred.

The preferred lithium-ion battery 30 is supplied with a heater 32 controllably powered by a power supply 34 through a switch 36 controlled by the system power controller 28. The battery 30 may be controllably discharged through a discharge load 38 through a switch 40 controlled by the system power controller 28. To controllably activate the battery 30, the heater 32 is operated by closing the switch 36 to heat the battery 30 to the higher-temperature range, with the switch 40 open. The battery 30 is then charged through the system power controller 28 with power supplied by the solar cells 24. The battery 30 is thereafter cycled through normal charging and discharging cycles. It may be possible to discontinue the heating by the heater 32 during normal charging and discharging cycles, due to the heat generated internally by the electrochemical reactions.

To controllably deactivate the battery 30, the switch 36 is opened to discontinue the heating and allow the battery to cool to the lower-temperature range. Depending upon the cooling system of the battery, the heater 32 may be periodically turned on to keep the temperature of the battery within the lower-temperature range. For example, if the battery 30 is cooled by exposure to the space environment, the cooling may be so great that the temperature of the battery would fall too low unless periodically heated to maintain the lower-temperature range. To discharge the battery 30 in preparation for deactivation, the switch 40 is closed to discharge the remaining stored energy across the discharge load 38. When the battery 30 is deactivated, it is taken off line from the power bus by opening a switch 42.

The battery 30 may thereafter be controllably reactivated by opening the switch 40 and closing the switch 36 to heat the battery back to the higher-temperature range, as described above. Once the battery 30 is reactivated, the switch 42 is closed to place it back on line with the power bus 25. The activation-use/deactivation cycle is repeatable over a large number of cycles.

Figure 4:
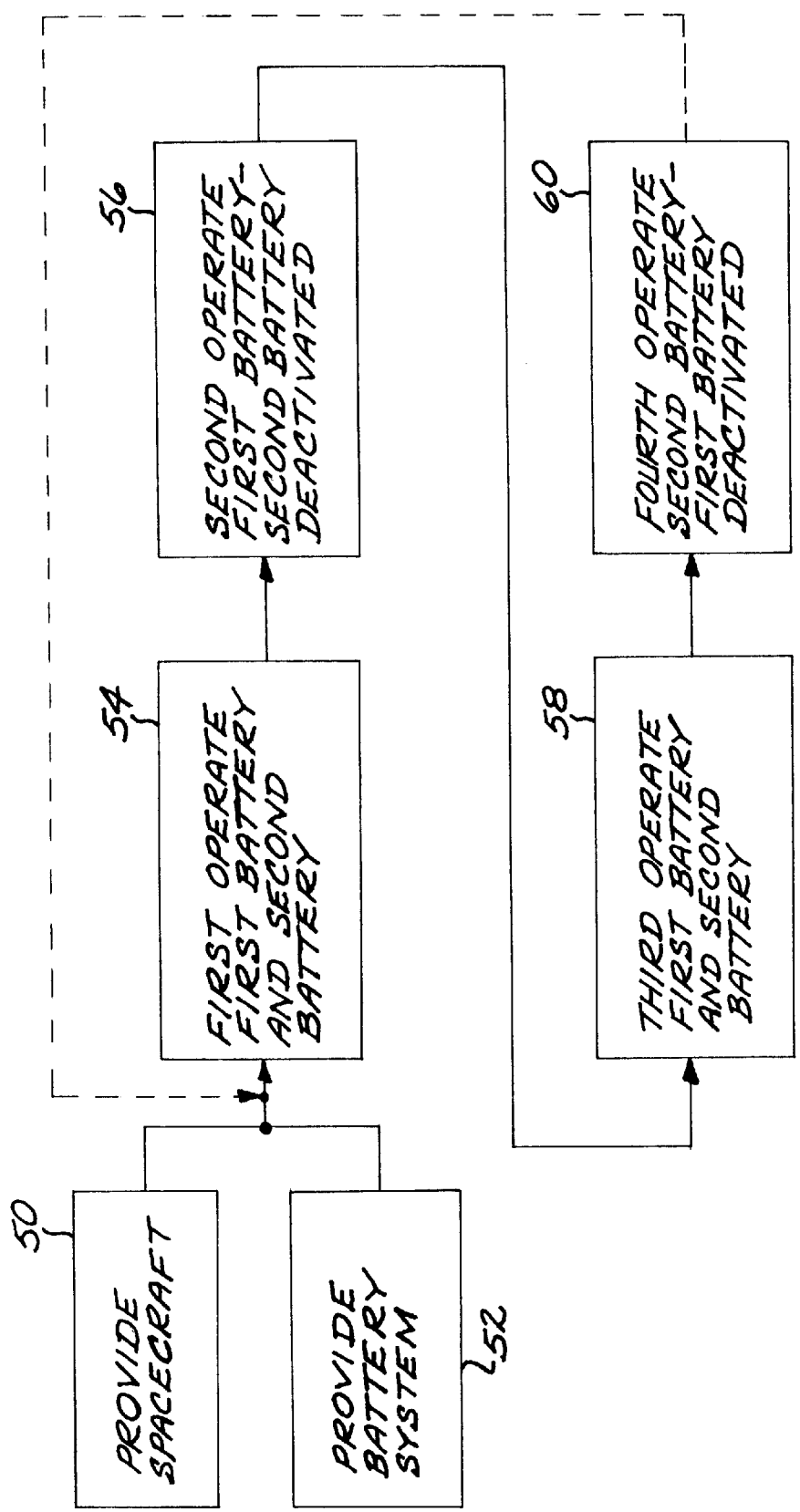
FIG. 4 is a block diagram of a preferred approach for practicing the invention.

FIG. 4 illustrates a preferred approach for practicing the invention. The spacecraft, such as the communication satellite 20 in geosynchronous orbit, is provided, numeral 50, with a battery system 26 as discussed previously, numeral 52. The satellite is powered for a first (eclipse) period time with both batteries 30a and 30b activated and operational, numeral 54. The first period is about 1½ months long. At the end of the first period, the second battery 30b is deactivated, and the satellite is thereafter powered for a second (solstice) period of time with only the first battery 30a activated and operational, numeral 56. The second period is about 4½ months long. At the end of the second period, the second battery 30b is reactivated, and the satellite is powered for a third (eclipse) period of time with both batteries 30a and 30b activated and operational, numeral 58. The third period is about 1½ months long. At the end of the third period, the first battery 30a is deactivated, and the satellite is thereafter powered for a fourth (solstice) period of time with only the second battery 30b activated and operational, numeral 60. The fourth period is about 4½ months long. The cycle is repeated for the next 12 month period.

The first, second, third, and fourth periods total 12 months in length, but each battery operates for only 7½ of those months. During the remaining 5½ months when a battery is deactivated, it does not substantially chemically degrade, so that, in effect, its useful life may be extended. Stated alternatively, for a satellite with a 15 year operating life, each battery would be expected to operate for only about 9.4 years.

The life of the battery is determined to some extent by the degree of charging relative to a maximum charge capability, and the degree of discharging relative to a maximum discharge capability, in each charge/discharge cycle. In conjunction with the present invention, the degree of charging and the degree of discharging may be limited responsive to the power demands of the power-consuming components 22 to a partial charging/discharging cycle, thereby further lengthening the life of the battery. That is, the life of the battery may be lengthened by limiting the degree of charging and discharging to, for example, 75 percent of the maximum values during portions of the activated periods, if that limitation is possible within the constraint that the power-consumption needs of the spacecraft must be supplied. For example, the first battery may be operated through a partial charging/discharging cycle during the second period of time, and the second battery may be operated through a partial charging/discharging cycle during the fourth period of time.

The present invention has been described in relation to a preferred application of a communications satellite in geosynchronous earth orbit with two batteries. It may be applied to other circumstances such as a satellite in geosynchronous orbit with a larger number of batteries; a satellite in another earth orbit where there are alternating periods of continuous sunlight and sunlight/shadow; a spacecraft on certain deep space missions; or a satellite in geosynchronous or other orbit around another body in space.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for powering a spacecraft, comprising the steps of
    providing a spacecraft having power-consuming components therein;
    providing in the spacecraft at least two independently controllable electrical storage batteries operably connected to the power-consuming components of the spacecraft, each battery being operable in a higher-temperature range and inactivated in a lower-temperature range, including a first battery and a second battery;
    first operating both the first battery and the second battery in the higher-temperature range during a first period of time; thereafter
    second operating the first battery in the higher-temperature range during a second period of time, the second battery being non-operational and in the lower-temperature range during the second period of time; thereafter
    third operating both the first battery and the second battery in the higher-temperature range during a third period of time; and thereafter
    fourth operating the second battery in the higher-temperature range during a fourth period of time, the first battery being non-operational and in the lower-temperature range during the fourth period of time.

2. The method of claim 1, wherein the first battery and the second battery are each lithium ion batteries.

3. The method of claim 1, wherein the higher-temperature range is from about 5° C. to about 15° C.

4. The method of claim 1, wherein the lower-temperature range is from about −30° C. to about −10° C.

5. The method of claim 1, including the additional step, after the step of fourth operating, of
    performing the sequence of steps of first operating, second operating, third operating, and fourth operating, in that order, at least one additional time.

6. The method of claim 1, wherein the first battery and the second battery each comprises:
    at least one electrochemical cell, and
    a heater operable to controllably heat the electrochemical cell to the higher-temperature range.

7. The method of claim 1, wherein the first period of time and the third period of time are each about 1½ months in duration.

8. The method of claim 1, wherein the second period of time and the fourth period of time are each about 4½ months in duration.

9. The method of claim 1, wherein the first battery is operated through a partial charging/discharging cycle during the second period of time.

10. The method of claim 1, wherein the second battery is operated through a partial charging/discharging cycle during the fourth period of time.

11. The method of claim 1, wherein the spacecraft is in geosynchronous orbit about the earth.

12. A method for powering a spacecraft, comprising the steps of providing a spacecraft having at least two independently controllable electrical storage batteries operably connected to power-consuming components of the spacecraft, each battery being controllably activatable and controllably deactivatable, including a first battery and a second battery;

first operating both the first battery and the second battery during a first period of time with both batteries in an activated state; thereafter second operating the first battery during a second period of time in the activated state, the second battery being in a deactivated state during the second period of time; thereafter third operating both the first battery and the second battery during a third period of time with both batteries in the activated state; and thereafter fourth operating the second battery during a fourth period of time in the activated state, the first battery being in the deactivated state during the fourth period of time.

13. The method of claim 12, wherein the first battery and the second battery are each lithium ion batteries.

14. The method of claim 12, including the additional step, after the step of fourth operating, of performing the sequence of steps of first operating, second operating, third operating, and fourth operating, in that order, at least one additional time.

15. The method of claim 12, wherein the first period of time and the third period of time are each about 1½ months in duration.

16. The method of claim 12, wherein the second period of time and the fourth period of time are each about 4½ months in duration.

17. The method of claim 12, wherein the first battery is operated through a partial charging/discharging cycle during the second period of time.

18. The method of claim 12, wherein the second battery is operated through a partial charging/discharging cycle during the fourth period of time.

19. The method of claim 12, wherein the spacecraft is in geosynchronous orbit about the earth.

* * * * *